June 22, 1971     J. CHIN ET AL     3,586,742
PROCESS OF PREPARING OXIDE MICROSPHERES
Filed Nov. 25, 1966
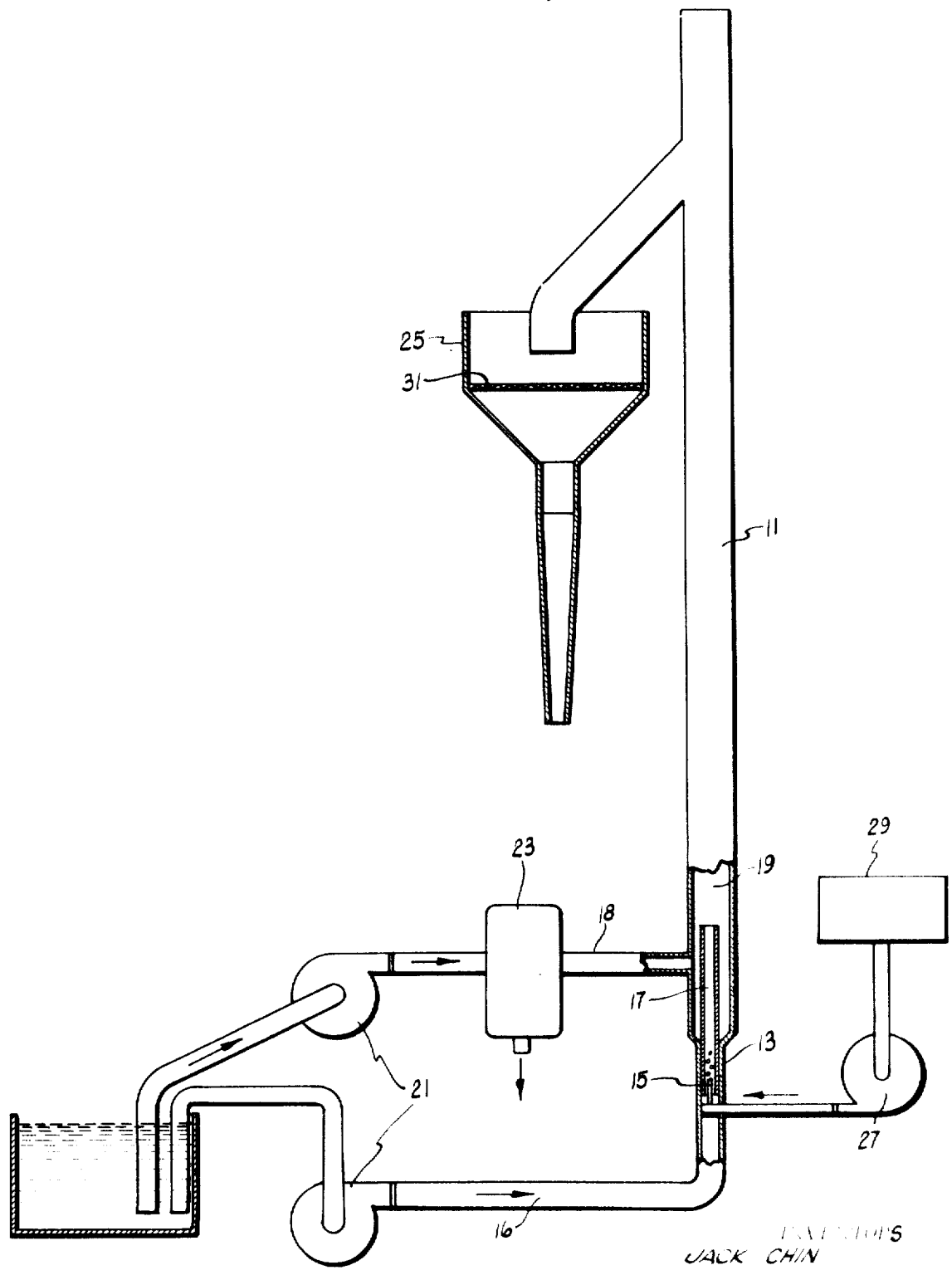
INVENTORS
JACK CHIN
ROY E. NORMAN
JAMES H. THOMPSON
BY Anderson, Luedeka, Fitch, Even, & Tabin

United States Patent Office

3,586,742
Patented June 22, 1971

---

3,586,742
PROCESS OF PREPARING OXIDE MICROSPHERES
Jack Chin and Roy E. Norman, San Diego, and James H. Thompson, El Cajon, Calif., assignors to Gulf Energy & Environmental Systems, Inc.
Filed Nov. 25, 1966, Ser. No. 597,094
Int. Cl. G21c *21/00*
U.S. Cl. 264—.5   12 Claims

ABSTRACT OF THE DISCLOSURE

Oxide microspheres are prepared by injecting droplets of an aqueous metal oxide sol into a stream of organic liquid that is substantially immiscible with the sol. Gaseous ammonia is dissolved in the organic liquid, and contact between the liquid stream and the droplets is maintained for a sufficient time to permit the ammonia from the organic liquid to gel the sol droplets. Uranium-thorium oxide microspheres can be produced using kerosene or carbon tetrachloride into which gaseous ammonia has been bubbled.

---

The present invention relates generally to a process for producing spherical particles and more particularly relates to producing small spherical particles useful as nuclear fuel materials.

In certain nuclear reactor designs, the nuclear fuel is supplied in particle form. Spherical particles provide certain desirable heat transfer characteristics, and when it is considered desirable to coat the particles, a uniform coating is readily applied to spherical particles.

Various methods have been used to prepare spherical nuclear fuel particles, such as melting the material and allowing it to free fall in a tower as in the production of lead shot, ball milling sintered irregularly shaped particles until a spheroidal shape is produced, and plasma-arc melting of sintered particles, but none of these methods have been wholly satisfactory.

Accordingly, it is an object of this invention to provide an improved process for preparing spherical particles. It is another object of this invention to provide a process for preparing spherical particles of nuclear fuel materials that are of uniform size. A further object of this invention is to provide a process for preparing spherical particles of nuclear fuel material which process is simple, economical, and easy to control. A still further object of this invention is to provide a continuous process for preparing spherical particles.

These and other objects of the invention are more particularly set forth in the following detailed description and in the accompanying drawing which is a block diagram of a flow sheet illustrating various features of this invention.

In general, the process of this invention involves the formation of gel particles in situ through the gelation of spherical droplets of a sol of the desired materials through the action of a gelling agent. For purpose of this application, the terms "sol" and "gel" are used in their broadest sense, wherein gels refer to two-phase colloidal system consisting of a solid and a liquid which behave as elastic solids and retain their characteristic shape, and wherein sols refer to a two-phase colloidal system also consisting of a solid and a liquid which possesses the shape of the container. Both sols and gels, however, may contain dissolved materials in the liquid phase of the system.

More particularly, a process is provided for producing spherical particles of nuclear fuel material of a desired range of particle sizes from a sol of the material by means of an ammonium gelling reaction. In general, spherical particles may be formed from any nuclear fuel material, or mixtures of material, from which a sol may be prepared that will gel upon contact with ammonia.

In one embodiment of this invention, a sol is prepared from thorium oxide and uranium which are present in a suitable ratio for a nuclear fuel material. Sols of thorium oxide and uranium may be prepared by any suitable method. When the uranium content, expressed as equivalent uranium dioxide, is less than about 5 percent by weight of the thorium oxide, it is preferred to add the uranium as a uranyl nitrate solution to a previously prepared sol of thorium oxide, utilizing water as a carrier. This results in a solution of uranyl nitrate in a thorium oxide sol with an accompanying pH of about 3 as a result of the nitrate ion. When the desired uranium content, expressed as equivalent uranium dioxide, exceeds about 5 percent by weight of the thorium oxide, it is preferred to add the uranium in the form of uranium trioxide. In the latter case, nitric acid is added to yield a sol with a pH equivalent to that when the uranium is added as uranyl nitrate, that is, about 3. In general, small oxide spheres can be made from uranium-thorium oxide mixtures which contain uranium dioxide in an amount from 0 to 20 weight percent, based upon weight of thorium oxide.

Spherical droplets of the sol are produced by dispersing the sol in a suitable organic liquid that is immiscible with the carrier portion of the sol. When water is used as the carrier, two preferred organic liquids are kerosene and carbon tetrachloride. As used herein, kerosene is defined as the refined petroleum fraction distilled from the fraction of crude oils boiling between 350° F. and 550° F., having a specific gravity of about 0.80 and which remains liquid to about −25° F. The dispersed droplets of sol attain spherical shapes due to their inherent surface tension in their dispersed state within the immiscible organic liquid. A surfactant may be added to the organic liquid to prevent coalescing of the droplets and thereby maintain the droplets in the dispersed state.

One method for producing the dispersion of sol droplets is to spray the sol into a stirred organic liquid containing a surfactant. The average size and the particle size distribution of the droplets is then controlled by the conditions of spraying. Gel particles may then be formed by bubbling gaseous ammonia through the solution containing the dispersed droplets. Preferably, however, the droplets are formed continuously in a system for continuous production of gel particles.

As shown specifically in the drawing, a continuous process for producing spherical particles through ammonium gelling may be used. In this embodiment, sol droplets 13 are formed at the bottom of a column 11 and come in contact with a fluid stream as the droplets and the fluid travel upwardly in concurrent flow through the column 11. The fluid employed is an organic liquid which has a reacting agent dispersed therein as will be described more fully hereinafter.

Although the embodiment, as illustrated specifically in the drawing, shows the fluid and the sol in concurrent flow, it should be understood that countercurrent flow is suitable and may also be used.

The sol droplets may be formed and injected into the fluid by any suitable method. The preferred method of droplet generation is to discharge the sol through an orifice 15 into the confines of a small tube 17 through which a swiftly flowing organic liquid is maintained (supplied via the pipe 16), which liquid surrounds the sol droplets immediately after discharge from the orifice. The liquid bearing the droplets is, in turn, discharged upwardly into the bottom of the column wherein it mixes with a larger stream (supplied via the pipe 18) which is flowing upward to form the mainstream 19 of fluid which flows up the column 11. The larger stream is composed of the organic liquid with the reacting agent dissolved therein. As can be seen in the drawing, both streams may be taken from the same supply tank 20 of organic fluid and metered by separate fluid metering pumps 21. Alternatively, separate organic liquid streams may be supplied from separate tanks. This two-stream arrangement permits precise control over both the droplet formation organic liquid stream and the mainstream 19 of fluid.

The droplet size and droplet size distribution may be controlled by varying the size of the sole injection orifice 15, the velocity of the organic liquid stream in the tube 17, the density and viscosity (concentration) of the sol, the position and attitude of the sol injection orifice 15 in the surrounding tube 17 and the interfacial tension between the sol and the organic fluid (through selection of the particular organic liquid). Using this continuous process, droplets can be generated which will result in fully dense spheres between about 100 microns and about 1000 microns.

When gel particles are produced from thorium oxide and uranium sols, a suitable organic liquid is employed which is substantially immiscible with the sol, so that the sol remains in droplet form in the flowing stream. Surface tension maintains the droplets in spherical form until interaction between the sol droplet and the fluid stream, to form gel particles, is substantially complete. Preferably, the sol should be relatively immiscible i.e. less than about 1 percent soluble, in the organic liquid.

As can be seen in the drawing, the larger stream of organic liquid is contacted with a suitable reacting agent before it is introduced into the column through pipe 18. Although the mechanism of gelation is not completely understood, it is believed that a reacting agent contained in the fluid stream will diffuse across the interfacial boundary between the sol droplets and the fluid to change the pH of the sol and convert the sol into a gel. Since the mechanism is pH dependent, it is believed that any suitable reacting agent capable of effecting pH change in the sol droplets may be utilized. Preferably, a gas is employed as the reacting agent which gas is soluble in the organic liquid and will effect the desired pH change in the sol. Ammonia is preferred, and the organic liquid is saturated with ammonia in a gas bubbler 23. The term "fluid" is used to refer to the organic liquid with the gas dissolved therein. The preferred fluid is kerosene saturated with gaseous ammonia.

The illustrated column 11 contains an upwardly flowing mainstream of fluid which carries the sol droplets upward in concurrent flow with the fluid. The column 11 may be operated in concurrent flow using a fluid velocity sufficient to carry the droplets produced from the droplet generator upward through the column within a very short time. This limits the time which particles have in which to collide and agglomerate and thus helps keep the formation of oversize particles at a low level. However, the fluid velocity is adjusted to provide a minimum dwell time in the column for the smallest particle produced sufficient for complete reaction with the fluid to effect the pH change. The short droplet dwell time in the column 11 is made possible by the rapid nature of the sol/fluid interaction to produce gel particles. An interaction time of from about 0.5 to about 1.0 minute is sufficient to complete the ammonia gelling reaction.

The resultant gel particles are carried over the top of the column 11 and into suitable means 25 for separating the particles from the fluid. Any suitable particle harvesting system may be used with the illustrated column overflow system. It may be simple in concept, such as a mesh screen 31 of the proper size opening, or may be more elaborate and incorporate means for automatic conveyance to drying and calcining equipment. Particle drying is rapidly accomplished in a hot-air circulating oven. The dried particles are then sintered in a reducing atmosphere to produce a stable oxide form.

After separation from the gelled particles, the overflow fluid may be further treated to remove ammonia and contaminants by heating and contacting with calcium oxide in a by-pass system (not shown).

The following examples further illustrate processes for producing spheres embodying various of the features of the invention. It should be understood that these examples are intended to in no way limit the scope of the invention which is defined in the appended claims.

EXAMPLE 1

A column 11 is constructed for producing small spheres of mixtures of thorium and uranium oxides by gelling with ammoniated kerosene. The column consists of a 2-inch inside diameter Pyrex glass tube having a height of 7 feet, as measured between the top of a droplet generator orifice 15, located at the bottom of the column, and an overflow outlet located at the top of the column. The column extends one foot above the overflow outlet to provide for kerosene buildup above the overflow. The overflow outlet consists of a 2-inch inside diameter Pyrex glass tube joined to the column so as to form a downwardly steeply pitched Y member. The angle between the overflow tube and the column 11 is acute so as to provide as little contact between gelled particles and the overflow tube as possible.

The droplet generator consists of a 0.5 mm. orifice 15 which is connected to a metering pump 27 which is supplied from a sol holding tank 29. The sol orifice tube is positioned inside a glass tube 17, of 3 mm. inside diameter, through a flexible seal which permits the attitude of the orifice 15 to be adjusted within the tube 17. The tube 17 is connected via the pipe 16 to a metering pump 21 which is supplied from a kerosene holding tank 20.

The droplet generator assembly is positioned in the bottom of the column 11 in such a manner that the tube 17 of the droplet generator extends upward from the orifice 15 for a distance of about 4 inches and terminates at a location above the outlet from pipe 18.

A sol is prepared which is 3 molar in thrium oxide and 0.15 molar in uranyl nitrate. The weight ratio of thorium oxide to equivalent uranium dioxide is about 20:1. The sol is prepared by adding dispersible thorium oxide of a crystallite size below about 70 A. to water at 80° C. while it is agitated. The uranium is added subsequently as a concentrated solution of uranyl nitrate and the mixture is stirred at 80° C. for about 30 minutes. The pH of the resulting sol is about 3.

The sol at room temperature is metered to the sol orifice 15 at the rate of about 3 ml. per minute of sol, which is equivalent to 2.5 grams of total oxides per minute. Kerosene at room temperature is pumped through pipe 16 to the tube 17 of the droplet generator. The flow of kerosene is adjusted to provide a particle size of between 200 and 1000 microns. This is accomplished by examination of particles in the filter after an initial run and subsequent variation in the flow.

Kerosene, which has been saturated with ammonia in a gas bubbler 23, is supplied to the bottom of the column at room temperature at rate sufficient to yield the particular particle size desired. This flow is sufficient ot provide a total dwell time in the column for the smallest droplet produced by the droplet generator of about 0.5 min. This time is sufficient to produce gel particlees from the sol droplets.

The upward flowing ammoniated kerosene containing the ammonia-gelled particles overflows through the outlet at the top of the column onto a Tyler 150 mesh stainless steel screen 31 which will retain particles about 100 microns and above. The column is operated for a period of one hour after equilibrium is obtained. A total of 150 grams of thorium oxide/ammonium diuranate spherical particles between about 150 and about 700 microns in size are obtained.

The gelled particles retained on the screen are dried thoroughly by heating them for 4 to 8 hours in a hot-air circulating oven at 60° C. The dried particles are then converted to high density (Th/U)O2 by sintering for several hours in a reducing atomsphere at 1150° C. The sintered particles are acceptably spherical in shape, have a density between about 8.5 gm./cc. and about 9.9 gm./cc., and range in size from about 100 microns to about 500 microns. They are considered entirely satisfactory for use as a nuclear fuel material in nuclear reactors.

EXAMPLE II

The apparatus of Example I is used to produce spherical gel particles from a sol of thorium oxide and uranium dioxide in which the weight ratio of thorium oxide to equivalent uranium dioxide is 10:1. The sol is prepared by adding dispersible thorium oxide of a crystallite size less than about 70 A. to dilute nitric acid at 80° C. while it is agitated. The resulting sol contains 0.07 to 0.1 mole of nitrate per mole of thorium dioxide. The uranium is added subsequently as a dry powder of uranium trioxide. The ph of the resulting sol is about 3.

The sol at room temperature is metered to the sol injection orifice 15 at the rate of about 3 ml. per minute of sol, which is equivalent to 2.5 grams of total oxides per minutes. Kerosene at room temperature is supplied to the tube 17 of the droplet generator.

Kerosene, which has been saturated with ammonia in a gas bubbler 23, is supplied to the bottom of the column at room temperature. The flow is sufficient to provide a total dwell time in the column for the smallest droplet produced by the droplet generator of about 0.5 min.

The upwardly flowing kerosene containing the ammonium-gelled particles overflows through the outlet at the top of the column 11 onto a Tyler 150 mesh stainless steel screen 31 which will retain particles about 100 microns and above. The column 11 is operated for a period of one hour after equilibrium has been obtained. A total of 150 grams of thorium oxide/uranium trioxide spherical particles between about 150 and about 700 microns in size are obtained.

The gelled particles retained on the screen are dried thoroughly by heating for 6 hours in a hot-air circulating oven at 60° C. The uranium trioxide is then converted to uranium dioxide by sintering the particles in a reducing atmosphere furnace for 4 hours at 1150° C. The sintered particles are acceptably spherical in shape, have a density between about 8.5 gm./cc. and about 9.9 gm./cc., and range in size from about 100 microns to about 500 microns. They are considered entirely satisfactory for use as a nuclear fuel material in nuclear reactors.

Various of the features of the invention are set forth in the following claims.

What is claimed is:

1. A process for preparing spheres which comprises dispersing droplets of an aqueous actinide oxide sol in an organic liquid that is substantially immiscible with said sol whereby surface tension maintains said droplets in spherical shape, and contacting said dispersed sol droplets for a predetermined time with ammonia that has been bubbled into said organic liquid, said ammonia interacting with said sol during said predetermined time so as to form gelled spherical particles.

2. A process in accordance with claim 1 wherein said organic liquid is kerosene or carbon tetrachloride.

3. A process in accordance with claim 2 wherein said actinide oxide is thorium oxide.

4. A process in accordance with claim 2 wherein said actinide oxide is uranium oxide.

5. A process in accordance with claim 2 wherein said sol contains a mixture of uranium and thorium oxides.

6. A continuous process for preparing small spherical particles which comprises injecting droplets of an aqueous actinide oxide sol into an organic liquid stream that is substantially immiscible with said sol whereby surface tension maintains said droplets in spherical form, which organic liquid has ammonia dissolved therein, and maintaining the velocity of said liquid stream sufficient to contact said sol droplets for a predetermined time, said ammonia interacting with said sol during said predetermined time to form gelled spherical particles.

7. A process in accordance with claim 6 wherein said organic liquid is kerosene or carbon tetrachloride.

8. A process in accordance with claim 6 wherein said droplets are injected into a stream consisting of said organic liquid alone which discharge into said fluid stream.

9. A process in accordance with claim 6 wherein the sol contains uranium oxide and thorium oxide.

10. A process in accordance with claim 8 wherein said droplets are injected into a stream of kerosene which merges into an upwardly flowing stream of kerosene substantially saturated with dissolved ammonia and wherein said sol contains uranium and thorium oxide with uranium being present at a level of up to about 20 weight percent of thorium, based upon weights of the respective oxides, and said sol having a pH of about 3.

11. A process in accordance with claim 10 wherein said droplets are no larger than about 1800 microns in diameter.

12. A process in accordance with claim 10 wherein said droplets have an average diameter between about 100 microns and about 1000 microns and said upwardly flowing fluid stream has a velocity so that said predetermined time is from about 30 to about 60 seconds.

References Cited

UNITED STATES PATENTS

| 3,312,631 | 4/1967 | Smith | 252—301.1 |
|---|---|---|---|
| 3,313,602 | 4/1967 | Smith et al. | 23—345 |
| 3,320,178 | 5/1967 | Dewell | 252—301.1 |
| 3,320,179 | 5/1967 | Gens | 252—301.1 |
| 3,329,745 | 7/1967 | Grange | 264—.5 |
| 3,331,898 | 7/1967 | Haas et al. | 264—.5 |
| 3,345,437 | 10/1967 | Flack et al. | 264—.5 |
| 3,355,525 | 11/1967 | Smith, et. al. | 264—.5 |
| 3,384,687 | 5/1968 | Flack et al. | 264—.5 |

REUBEN EPSTEIN, Primary Examiner

U.S. Cl. X.R.

23—345, 355; 264—13, 15 ;252—301.1